United States Patent [19]
Lessard

[11] 3,993,170
[45] Nov. 23, 1976

[54] SELF ADJUSTING FLOATING CALIPER DISC BRAKE

[75] Inventor: Normand Lessard, Valcourt, Canada

[73] Assignee: Bombardier Limited, Valcourt, Canada

[22] Filed: Oct. 28, 1975

[21] Appl. No.: 626,542

[52] U.S. Cl. ............................. 188/71.9; 188/72.3; 188/72.9; 188/73.3; 188/196 BA
[51] Int. Cl.² ........................................ F16D 55/02
[58] Field of Search .................. 188/71.8, 71.9, 72.8, 188/72.3, 72.7, 72.6, 72.9, 73.3, 196 B, 196 BA, 196 V; 192/111 A

[56] References Cited
UNITED STATES PATENTS

| | | | |
|---|---|---|---|
| 3,269,490 | 8/1966 | Swift | 188/71.9 |
| 3,702,125 | 11/1972 | Jeffries | 188/71.8 |
| 3,819,015 | 6/1974 | Silberschlag | 188/71.9 X |
| 3,907,074 | 9/1975 | Rist | 188/71.9 X |

Primary Examiner—Trygve M. Blix
Assistant Examiner—Douglas C. Butler

[57] ABSTRACT

A disc brake suitable for use in a snowmobile has a pair of friction pads associated with respective limbs of a U-shaped caliper. One of the friction pads is actuated through a mechanical linkage, and includes a ratchet-and-pawl operated automatic adjuster. The brake caliper is floatingly attached to a mounting plate to permit accomodation of the positions of the friction pads with respect to the disc.

6 Claims, 4 Drawing Figures

SELF ADJUSTING FLOATING CALIPER DISC BRAKE

BACKGROUND OF THE INVENTION

This invention relates to improvements in disc brakes. Brakes of this type are used in a large number of applications, particularly in automotive and other vehicles, such as snowmobiles.

SUMMARY OF THE INVENTION

The present invention provides a disc brake comprising: a mounting plate adapted for attachment in a fixed position relative to a rotatable disc; and a caliper assembly carried in said mounting plate and comprising: (a) a U-shaped caliper having a central web integral with first and second parallel limbs extending from opposite ends of the web, said caliper being non-rigidly connected to said mounting plate in a manner permitting a limited floating movement of the caliper relative thereto, (b) first and second brake pads of frictional material associated each with a respective one of said limbs and carried in spaced parallel relationship between said limbs, said first pad being fixed in relation to said first limb, said second pad being carried on a backing plate attached to a mounting member guided in a bore in the second limb, and being movable towards and away from said first pad, (c) said mounting member having a screw-threaded portion extending beyond said second limb and in threaded engagement in a cap which is rotatable thereon, (d) said caliper providing a pivotal mounting for an actuating lever operatively associated with said cap and pivotable from a released position wherein said second brake pad is retracted to an applied position wherein said second pad is moved towards said first pad, (e) spring means in said assembly operative to urge said second pad away from the applied position, and (f) automatic adjustment means comprising a peripheral ratchet on said cap defining a series of ratchet teeth and a co-operating pawl carried by said lever and engaging said ratchet to be movable generally longitudinally of said ratchet upon movement of said lever to the applied position, such that when in that movement the pawl psses over a tooth of said ratchet, subsequent return of said lever to the released position causes said pawl to engage and move that tooth producing an incremental rotation of said cap relative to said second brake pad and a corresponding adjustment in the retracted position of the second brake pad.

The floating mounting of the caliper permits slight adjustments in the position thereof so that the brake pads may better accommodate themselves to the surfaces of the brake disc. The caliper preferably has a third limb elongated in the direction of the lever so that an actuating mechanism, such as a bowden cable may be connected to operate between the third limb and the end of the lever.

BRIEF DESCRIPTION OF THE DRAWINGS

The invention will further be described, by way of example only, with reference to the accompanying drawings, wherein.

DESCRIPTION OF THE PREFERRED EMBODIMENT

Figure 1:
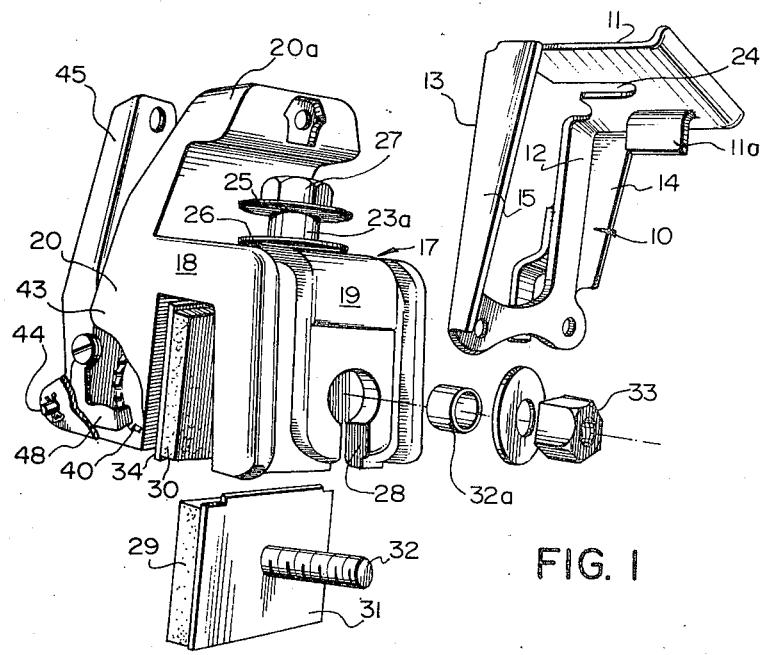
FIG. 1 is an exploded view of the disc brake and mounting plate.

The drawings show a disc brake designed for use as a braking means in a snowmobile (not shown). The brake comprises a mounting plate assembly generally indicated at 10 of sheet metal, having a flat rectangular top portion 11, and two depending limbs 12 and 13 stiffened by tapering angled walls 14 and 15. The top portion 11 supports an abutment member 11a which extends downwardly at right angles thereto. The limbs 12 and 13 of the mounting plate assembly are adapted to be secured by suitable fastening means to a fixed structure in the snowmobile, to support the disc brake in fixed relation to a disc 9 indicated in broken lines in FIG. 2 which rotates with the drive train of the snowmobile.

An h-shaped caliper 17 is carried by the mounting plate assembly, and received against the underside of the top portion 11, and with clearance between the depending limbs 12 and 13. The caliper 17 is of heavy gauge sheet metal, and has a rectangular web 18 and two spaced parallel limbs 19 and 20 and an upwardly extending link 20a. The web 18 has a central aperture 21 which receives the head 22 of a capscrew 23. The capscrew extends upwardly within a bushing 23a with clearance through a transversely elongated slot 24 in the top portion 11 of the mounting plate assembly and through spring washers 25, 26 mounted on opposite sides of the slot 24. The upper end of the capscrew 23 is engaged by a nut 27 which is tightened to clamp the caliper 17 to the mounting plate 10 through the spring washers 25, 26.

Within the caliper 17 are a pair of spaced parallel pads 29 and 30 of frictional material arranged to be clamped against opposite sides of the rotating disc to provide a braking force thereto. The friction pad 29 is carried on a rigid backing plate 31 having a threaded stud 32 extending through a slotted keyhole shaped opening 28 in the caliper limb 19, and clamped thereto by a nut 33. The friction pad 29 is thus rigidly secured to the caliper 17. As will be evident from FIGS. 1 and 2, when assembled the stud 32 is retained in the enlarged upper end of the opening 28 by a sleeve 32a which must first be extracted before the stud 32 can be moved downwardly out of the opening 28.

The friction pad 30 is carried on a rigid backing plate 34 from which extends a central threaded stud 35. The stud 35 is received in threaded engagement in a short cylindrical spindle 36, the spindle being rotatably and slidably supported in a tubular sleeve or bushing 37 which is rigidly attached to a tubular boss 37a in the limb 20 of the caliper 17. The tubular sleeve 37 is centrally affixed to a hollow cap 38 to be rotatable therewith. The sleeve 37 has a closed end surface 39 and the cap 38 comprises a cylindrical skirt on the end of which is formed an annular row of ratchet teeth 40.

Extending from opposite ends of the caliper limb 20 are two tapering elongated upstanding integral walls 43 which form a mounting for a pivot pin 44 extending transversely therebetween and spaced from the cap 38. A sheet metal channel shaped actuating lever 45 is pivoted on the pin 44 and extends generally lengthwise being received between the walls 43. The lever 45 is formed with a projection 47 close to the axis of the pivot pin 44 and engaging the end surface 39 of the cap 38.

Figure 2:
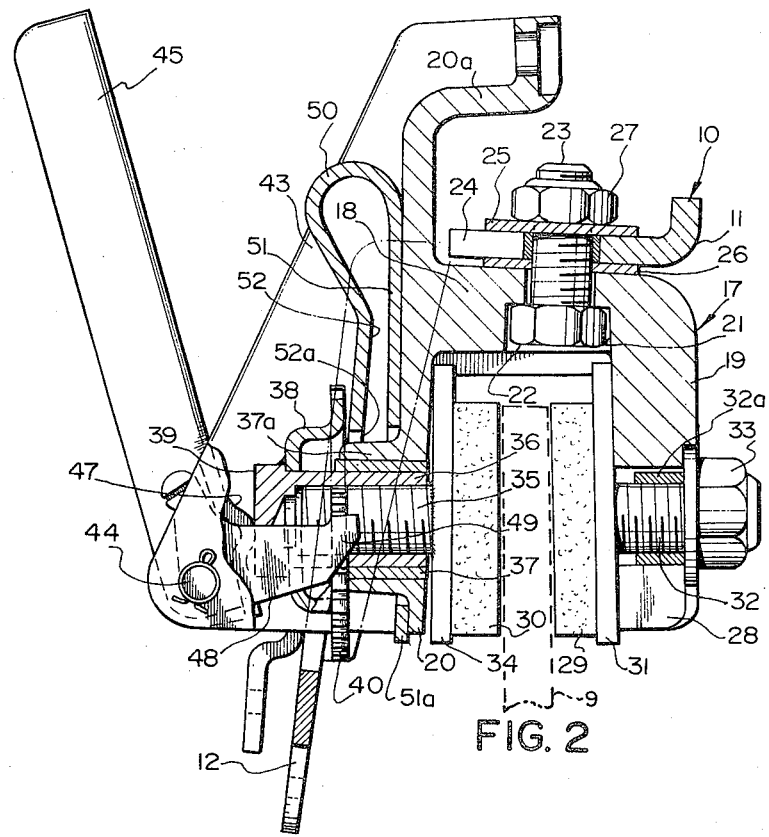
FIG. 2 is a sectional view taken on the line II—II of FIG. 3.
Figure 3:
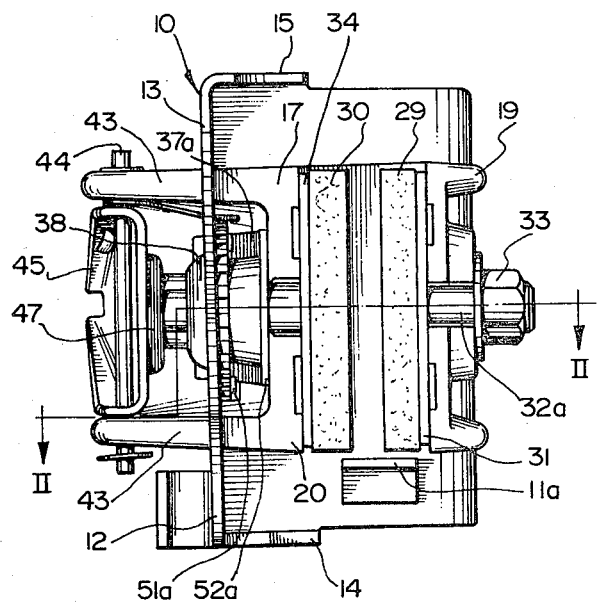
FIG. 3 is an underneath plan view of the assembly.
Figure 4:
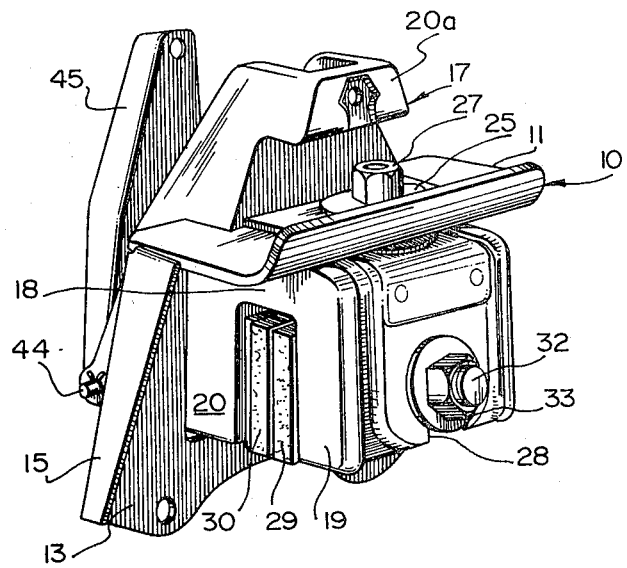
FIG. 4 is a perspective view of the assembly.

On one side of the lever 45 is a pawl 48 of spring steel, secured to the lever 45 and extending generally at right angles thereto. The pawl has a tooth portion 49 which lies adjacent and resiliently engages the ratchet teeth 40 as best seen in FIGS. 1, 2 and 3, the pawl being arranged to press laterally against the teeth 40.

Positioned between the tapering walls 43 is a U-shaped leaf spring 50 having one limb 51 which is pressed flat against the caliper limb 20 and has a bifurcate end 51a straddling the boss 37a. A second limb 52 of the spring has a bifurcate end 52a which engages under and presses against the cylindrical skirt of the cap 38 on both sides of the tubular sleeve 37.

From the foregoing description, it will be apparent that the brake assembly comprising the caliper 17, and the friction pads and their associated actuating mechanism, are floatingly mounted as a unit with respect to the mounting place assembly 10. The mounting plate assembly is attached to the brake assembly solely by means of the capscrew 23 which is retained in the slot 24 in the top portion 11 of the mounting plate assembly by means of the nut 27 and spring washers 25, 26. Thus the brake assembly is free to make slight adjustments in position to accommodate the friction pads 29 and 30 to the surfaces of the brake disc, braking torque being transmitted from the end of the caliper web 18 to the abutment 11a on the mounting plate. Such adjustments also compensate for wear of the fixed pad 29.

The U-spring 50 is effective to urge the friction pad 30 to a retracted position away from the brake disc by interaction with the cap 37. To apply the brake, the free end of the lever 45 is moved towards the bracket 41, whereupon the projection 47 is effected to press the cap 37, and hence through the spindle 36 and the threaded stud 35, the brake pad 30, into engagement with the rotating disc. The brake pad 29 is applied to the opposite face of the disc through reaction forces transmitted through the caliper 17, which by virtue of its floating mounting on the capscrew 23 can shift to equalize the braking forces between the pads.

As is well known, it is desirable to limit the distance through which the brake pads must travel before engaging the brake disc, especially since this distance tends naturally to increase through wear of the friction pads. The above described mechanism includes means for automatically adjusting this clearance. The angular movement of the lever 45 between its released position and its applied position, corresponds to the distance which must be moved by the brake pad 30 from its retracted position to engage the disc 16. This angular movement of the lever 45 produces a corresponding angular movement of the spring steel pawl 48 and of its tooth 49 which presses laterally against the ratchet teeth 40, and moves generally lengthwise thereof. Thus, if when the brake is applied the pawl tooth 49 moves past one of the teeth 40 of the ratchet, upon release of the lever 45, as the brake pad 30 is restored to its retracted position by the force of the spring 50, the pawl tooth 49, through engagement with that one ratchet tooth 40 produces an incremental rotation of the cap 38. By virtue of the threaded engagement between the stud 35 and the spindle 36, this incremental rotation produces an incremental increase in the distance between the operative surface of the brake pad 30 and the end surface 39 of the cap 38. The pad 30 is thus adjusted to a retracted position which is slightly closer to the disc 16 than hitherto.

It will be appreciated that as wear of the friction pads progresses, the pawl 48 will engage successive ones of the ratchet teeth 40 each time producing an incremental adjustment of the retracted position of the pad 30, and thereby maintaining the clearance between the friction pads and the disc 16 within desired limits. In between these incremental adjustments produced by the pawl, the cap 38 is prevented from rotating by frictional engagement of the bifurcate end 52a of the limb 52 of the U-shaped spring 50 which presses against the end of the cap adjacent the ratchet teeth 40.

It will be seen that the above described brake is readily adapted for operation by a mechanical actuator, such as a bowden cable (not shown) connected to operate between the ends of the bracket 41 and lever 45.

What I claim as my invention is:
1. A disc brake comprising: a mounting plate adapted for attachment in a fixed position relative to a rotatable disc; and a caliper assembly carried in said mounting plate and comprising:
   a. a U-shaped caliper having a central web integral with first and second parallel limbs extending from opposite ends of the web, said mounting plate having a portion which lies against one surface of the web, said caliper being non-rigidly connected to said mounting plate in a manner permitting a limited floating movement of the caliper relative thereto by a connection comprising a fastener having a head engaged in a recess in the caliper web and a shank extending through an elongated slot in said plate portion extending parallel to the axial direction of the disc, and resilient clamping means connecting said fastener to said mounting plate portion such that said caliper is floatingly supported thereon,
   b. first and second brake pads of frictional material associated each with a respective one of said limbs and carried in spaced parallel relationship between said limbs, said first pad being fixed in relation to said first limb, said second pad being carried on a backing plate attached to a mounting member guided in a bore in the second limb, and being movable towards and away from said first pad,
   c. said mounting member having a screw-threaded portion extending beyond said second limb and in threaded engagement in a cap which is rotatable thereon,
   d. said caliper providing a pivotal mounting for an actuating lever operatively associated with said cap and pivotable from a released position wherein said second brake pad is retracted, to an applied position wherein said second pad is moved towards said first pad,
   e. spring means in said assembly operative to urge said second pad away from the applied position, and
   f. automatic adjustment means comprising a peripheral ratchet on said cap defining a series of ratchet teeth and a cooperating pawl carried by said lever and engaging said ratchet to be movable generally longitudinally of said ratchet upon movement of said lever to the applied position, such that when in that movement the pawl passes over a tooth of said ratchet, subsequent return of said lever to the released position causes said pawl to engage and move that tooth producing an incremental rotation of said cap relative to said second brake pad and a corresponding adjustment in the retracted position of the second brake pad.

2. A disc brake according to claim 1 wherein said cap has an end face engaged by a projection on said lever to be moved thereby when the lever is pivoted to the applied position, upon release of said lever said cap being carried with said second brake pad when the latter is retracted by the force of said spring means, said cap interacting with said projection to return the lever to the released position.

3. A disc brake according to claim 2 wherein said spring means comprises a U-shaped leaf spring having one limb pressing against said caliper and a second limb pressing against said cap, said second limb engaging said cap with sufficient force to prevent undesired rotation of the latter.

4. A disc brake according to claim 3 wherein said caliper on one side is of elongated channel form having two spaced parallel upstanding walls which define a pivot axis for said lever transverse to the length of the channel, said lever extending generally lengthwise of the channel and said spring being received between the walls and against the side of the caliper.

5. A disc brake according to claim 1 wherein said bore in the second limb of the caliper is defined by a cylindrical sleeve mounted in said second limb and projecting outwardly thereof, said cap defining a cylindrical skirt enclosing one end of said sleeve and said ratchet being formed on said skirt.

6. A disc brake according to claim 1 wherein said spring means is operative to apply a frictional engagement force to said cap to prevent inadvertent rotation thereof.

* * * * *